United States Patent

Hashiuchi et al.

[11] Patent Number: 5,733,471
[45] Date of Patent: Mar. 31, 1998

[54] MAGNETITE PARTICLES AND PROCESS FOR PRODUCTION OF THE SAME

[75] Inventors: Masachika Hashiuchi; Katsuhiko Yoshimaru; Tadashi Yamanishi, all of Tamano, Japan

[73] Assignee: Mitsui Mining & Smelting Co., Ltd., Tokyo, Japan

[21] Appl. No.: 670,131

[22] Filed: Jun. 25, 1996

[30]     Foreign Application Priority Data

Jul. 4, 1995 [JP] Japan .................................. 7-189747

[51] Int. Cl.⁶ ..................... C01G 49/08; C03G 9/083; H01F 1/11
[52] U.S. Cl. ..................... 252/62.56; 252/62.59; 106/456; 106/457
[58] Field of Search ............... 252/62.56, 62.59; 106/456, 457

[56]          References Cited

U.S. PATENT DOCUMENTS 4,975,214   12/1990   Sakashita et al. ................ 252/62.56

Primary Examiner—Melissa Bonner
Attorney, Agent, or Firm—Morrison Law Firm

[57]          ABSTRACT

The present invention provides magnetite particles having a particle shape of an octahedron, a specific surface area of 5 $m^2/g$ or more as determined by the BET method and, a coercive force of 40 to 100 Oe, or a particle shape of a hexahedron, a specific surface area of 6 $m^2/g$ or more as determined by the BET method and a coercive force of 40 to 80 Oe, and a process for production of magnetite particles 6 Claims, 1 Drawing Sheet Magnetization

MAGNETITE PARTICLES AND PROCESS FOR PRODUCTION OF THE SAME

BACKGROUND OF THE INVENTION

1. Field of the Invention

The present invention relates to magnetite particles and a process for the production of the same and more specifically to magnetite particles having a coercive force of 40 to 100 Oe in a particle shape of an octahedron or a coercive force of 40 to 80 Oe in a particle shape of a cubic and presenting a black color, which is particularly used as a use for a magnetic powder for an electrostatic copying magnetic toner and a black pigment powder for a paint, and a process for the production of the same.

2. Description of the Prior Art

Recently, as a magnetic toner material for a dry-type electronic copying machine, a printer or the like, magnetite particles obtained by solution reactions have widely been used. Various types of development properties are generally required as a magnetic toner. However, with the development of the electrophotographic technology, a copying machine or a printer using a digital technology has rapidly been developed, and the prescribed properties have become higher. That is, the output of graphics, photographies and the like as well as conventional characters are required. In particular, among printers, a printer having an ability of 600 dots or more per inch has appeared so that latent images on a photoreceptor become further precise. Accordingly, a high fine-line reproducibility in the development is strongly demanded.

However, Japanese Patent Application Laid Open Gazette No. Hei 3-1160, describes that toners are dispersed in the periphery of an image in a case where the coercive force of magnetic powder exceeds 100 Oe, and that for this reason, it is difficult to respond to a demand for a higher reproducibility of a mesh point or fine line.

Magnetite particles obtained by a wet process in which a conventional mixed aqueous solution of an aqueous solution containing ferrous ions and an alkaline aqueous solution is oxidized under a specific condition, have a shape mainly of octahedron, cubic or spherical.

Nevertheless, magnetite particles satisfying the coercive force of 100 Oe or less have a shape similar to a spherical one although depending on the particle diameter thereof. It is well known that magnetite particles having a particle shape of, for example, an octahedron have a specific surface area of 5 m²/g or more and a coercive force of above 100 Oe. On the other hand, it is well known that magnetite particles having a particle shape of a cubic have a specific surface area of 6 m²/g or more and a coercive force of above 80 Oe.

SUMMARY OF THE INVENTION

Accordingly, it is an object of the present invention is to solve such conventional problems and provide magnetite particles having a specific surface area of a desired value or more, and having a coercive force of not more than 100 Oe in a particle shape of an octahedron, and a coercive force of not more than 80 Oe in a particle shape of a cubic, and further provide a process for the production of the magnetite particles.

The present inventors have tried to strain a lattice of the magnetite crystal by allowing silicon to contain inside of the octahedron-shaped magnetite particles. The B-H hysteresis loop of the silicon contained magnetite particles therein is characteristically bent as shown in FIG. 1. It seemed that the bending of this B-H hysteresis loop is derived from a magnetic anisotropy based on the crystal lattice strain. Thus, the present inventors have found that when relaxation of the lattice strain by heat treatment is evaluated, the particle coercive force is decreased.

That is, magnetite particles according to the present invention are characterized in that they have a particle shape of an octahedron, a specific surface area of 5 m²/g or more as determined by the BET method and a coercive force of 40 to 100 Oe, or they have a particle shape of a cubic, a specific surface area of 6 m²/g or more as determined by the BET method and a coercive force of 40 to 80 Oe.

The magnetite particles according to the present invention have a shape of an octahedron or a cubic. The magnetite particles according to the present invention have advantages of the fact that the octahedron-shaped or cubic shaped magnetite particles have a lower apparent density, a larger oil absorption and a relatively sharp particle size distribution in comparison with spherical magnetite particles. Further, the magnetite particles according to the present invention have a coercive force of 40 to 100 Oe. When the coercive force exceeds 100 Oe, toners are scattered in the periphery of an image as mentioned-above, and for this reason, it is difficult to respond to a demand for a higher reproducibility of a mesh point or fine line. Further, it is substantially difficult to produce magnetite particles having a coercive force of less than 40 Oe. A specific surface area of the magnetite particles according to the present invention is preferably 5 to 20 m²/g as determined by the BET method. It is preferable that the magnetite particles according to the present invention contain silicon. The content of silicon is 0.1 to 3.0% by weight with respect to the magnetite particles. When the content of silicon deviates from the above-mentioned range, the coercive force in the above-mentioned range cannot be obtained.

Next, a process for the production of the magnetite particles according to the present invention will be described. The production process of the magnetite particles according to the present invention is characterized in that the process comprises the steps of mixing an aqueous solution of ferrous salt with a silicate aqueous solution to obtain a mixed solution, further mixing the thus obtained mixed solution with an alkaline aqueous solution to obtain a ferrous hydroxide slurry, oxidizing the thus obtained ferrous hydroxide slurry to obtain an oxidized hydroxide slurry and washing it with water, flitrating, drying and grinding to obtain magnetite particles, and heat treating the thus magnetite particles so that the content of FeO within the magnetite particles is 18% by weight or more.

According to the present invention, a ferrous salt aqueous solution is mixed with a silicate aqueous solution. Examples of the ferrous salt aqueous solution are a ferrous sulfate aqueous solution, ferrous chloride aqueous solution or the like. The concentration and amount of the silicate aqueous solution are controled so that silicon of 0.1 to 3.0% by weight is contained with respect to a finally obtained magnetite particles.

After that, the mixed solution of this ferrous salt aqueous solution and the silicate aqueous solution is mixed with an alkaline aqueous solution to form a ferrous hydroxide slurry and then an oxygen containing gas, preferably the air is blown into the slurry to carry out an oxidation reaction at a temperature of 60° to 100° C., preferably, 80° to 90° C.

After the oxidation reaction is completed, each of processes of washing, filtration, drying and grinding is carried out to obtain magnetite particles. This drying process means that the moisture within a cake is evaporated at a temperature of below 100° C. and then, a loss of the moisture within the powder of the magnetite particles reaches 0.5% or less at a temperature of 100° C. for an hour.

The average particle diameter of each of the thus obtained magnetite particles is preferably 0.05 to 2.0 μm, more preferably 0.1 to 0.6 μm. When the average particle diameter is too small, the magnetite particles tend to agglomerate and the environment resistance of the particles is deteriorated. Further, the degree of black color is also deteriorated as the hue thereof. Furthermore, in such case, the magnetite particles has super paramagnetism, whereby the saturation magnetization as well as the coercive force is decreased. In a case where the average particle diameter is too large, when the magnetite particles dispersed into a toner are used, it is excessively stuck out of the surface of the toner or the deviation of the particle occurs, which is undesirable. In other words, since the magnetite particles have a single magnetic domain structure in the average particle diameter of about 0.18 μm or less, the coercive force of the magnetite particle becomes large. However, when the magnetite particles have a smaller average particle diameter than the above-mentioned one, magnetite particles which present the superparamagnetism are increased (T. Takada, DENKI KAGAKU (Japan), Vol. 37, p. 330 (1969)).

After that, these magnetite particles are heat treated in the present invention. As the atmosphere of the heat treatment, any of an oxidizing atmosphere such as the air or the like and an inert atmosphere such as the nitrogen or the like can be used. Further, although various heat treatment temperatures are used in accordance with the magnetite particle size or time, when the heat treatment is carried out in an oxidizing atmosphere, the heat temperature may be set so that FeO within the magnetite particles to be obtained is 18% by weight or more. Nevertheless, when the heat treatment is carried out at a low temperature, the heat treatment time becomes long, and on the other hand, when the heat treatment is carried out at a high temperature, the heat treatment time becomes short. However, since the short time treatment at the high temperature is industrially difficult, it is preferable that the heat treatment temperature of the magnetite particles is 100° to 300° C. On the other hand, when the heat treatment is carried out in an inert atmosphere, a heat treatment process may be selected so that the heat treatment can be carried out at below the sintering temperature of the magnetite particle for a suitable time. The coercive force of the magnetite particles is further decreased by 10% or more in comparison with the coercive force of a dried, non-heated magnetite particle by this heat treatment. It is necessary to prevent the deterioration of the degree of a black color in the heat treatment of the magnetite particle by setting the temperature and the time so that FeO within the magnetite particle is 18% or more.

It has conventionally been recognized that when the magnetite particles are gradually oxidized, $Fe^{2+}$ ions within $Fe_3O_4$ particles are then oxidized so that the color of the magnetite particle is gradually changed from black to brown with the result that the coercive force thereof is increased in the approximate composition of FeO=10%. This phenomenon is explained by the fact that a part of $Fe_3O_4$ particles is changed to a $\gamma$-$Fe_2O_3$ intermediate oxide film.

The present inventors have assumed that since the coercive force of the magnetite particles was decreased regardless of an oxidizing or an inert heat treatment atmosphere, the decrease in the coercive force thereof is derived from heat relaxation of the lattice strain. Further, the B-H hysteresis loop of heat treated magnetite particles tended to become smaller in curve of the loop.

Furthermore, when the heat treatment is carried out according to the present invention, the saturation magnetization ($\delta s$) and residual magnetization ($\delta r$) tended to increase particularly in the external magnetic field of 1 kOe. It seems that this is because the magnetic anisotropy which is mainly based on the lattice strain is improved to thereby enhance the magnetic permeability by the heat treatment.

PREFERRED EMBODIMENTS OF THE INVENTION

Figure 1:
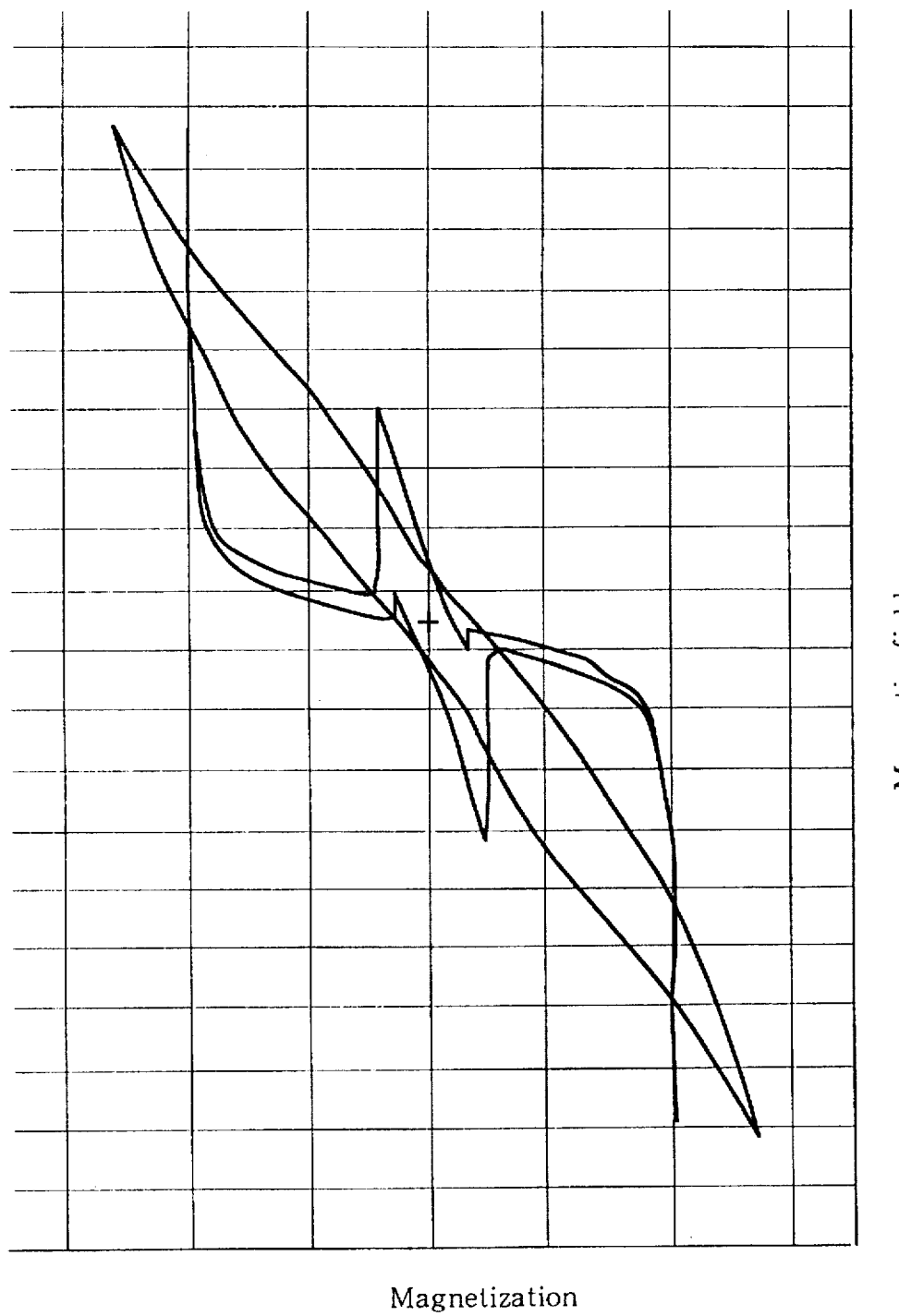
FIG. 1 is a view showing a hysteresis loop of magnetite particles A described in Example 1.

The invention will now be described concretely with reference to the following Examples and Comparative Examples.

EXAMPLE 1

As shown in Table 1, 50 l of a ferrous sulfate aqueous solution containing 2.0 mol/l $Fe^{2+}$ was mixed with 20 l of a sodium silicate (No. 3) aqueous solution containing 0.192 mol/l $Si^{4+}$. After that, the obtained mixture was mixed with 43 l of 5.0 mol/l sodium hydroxide aqueous solution while stirring them, and 65 l/min of the air was blown into the mixture while keeping the temperature at 90° C., and the reaction was allowed to complete. The thus obtained particles were subjected to a usual washing, filtration, drying and grinding to thereby obtain magnetite particles A.

As to the obtained particles A, the specific Surface area, FeO % by weight within the particles, the magnetic properties, and the particle shape were evaluated by the following methods. The obtained results are shown in Table 2.

The magnetic hysteresis loop (1 kOe, and 10 kOe of external magnetic fields) of the magnetic particles A is shown in FIG. 1.

(1) Specific surface area 2200 type BET meter produced by Shimazu-Micromerytics was used.

(2) Magnetic properties

VSM-P7 type of vibration specimen type magnetometer produced by Toei kogyo was used.

(3) FeO

Oxidation-reduction titration method by use of potassium permanganate standard solution was used.

(4) Particle shape

Directly observed by use of the Scanning Electron Microscope (SEM).

Further, the magnetite particles A were heated at 150° C. in the air for 0.5 hour, as shown in Table 3.

As to the obtained magnetite particles A, the specific surface area, FeO % by weight within the particles, the magnetic properties, and the particle shape thereof were evaluated by the same methods as mentioned above. The obtained results are shown in Table 4.

EXAMPLES 2 TO 8

The magnetite particles A obtained in Example 1 were treated in the same manner as in Example 1 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 4.

EXAMPLE 9

As shown in Table 1, the same treatment as in Example 1 was made except that the concentration of the sodium silicate aqueous solution and the amount of the sodium hydroxide aqueous solution were changed, whereby magnetite particles B were obtained. As to the obtained particles B, the specific surface area, FeO % by weight within the particles, the magnetic properties, and the particle shape thereof were evaluated by the same methods as in Example 1. The obtained results are shown in Table 2.

Further, the magnetite particles B were heated at 150° C. in the air for 0.5 hour, as shown in Table 3. As to the obtained magnetite particles, the specific surface area, FeO % by weight within the particles, the magnetic properties, and the particle shape thereof were evaluated by the same methods as in Example 1. The obtained results are shown in Table 4.

EXAMPLES 10 TO 14

The magnetite particles B obtained in Example 9 were treated in the same manner as in Example 9 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 4.

EXAMPLE 15

As shown in Table 1, the same treatment as in Example 1 was made except that the concentration of the sodium silicate aqueous solution and the amount of the sodium hydroxide aqueous solution were changed, whereby magnetite particles C were obtained. As to the obtained magnetite particles C, the specific surface area, FeO % by weight within the particles, the magnetic properties, and the particle shape thereof were evaluated by the same methods as in Example 1. The obtained results are shown in Table 2.

Further, the magnetite particles C were heated at 150° C. in the air for 0.5 hour, as shown in Table 3. As to the obtained magnetite particles, the specific surface area, FeO % by weight within the particles, the magnetic properties, and the particle shape thereof were evaluated by the same methods as in Example 1. The obtained results are shown in Table 4.

EXAMPLES 16 TO 18

The magnetite particles C obtained in Example 15 were treated in the same manner as in Example 15 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 5.

EXAMPLE 19

As shown in Table 1, the same treatment as in Example 1 was made except that the concentration of the sodium silicate aqueous solution and the amount of the sodium hydroxide aqueous solution were changed, whereby magnetite particles D were obtained.

As to the obtained magnetite particles D, the specific surface area, FeO % by weight within the particles, the magnetic properties, and the particle shape thereof were evaluated by the same methods as in Example 1. The obtained results are shown in Table 2.

Further, the magnetite particles D were heated at 150° C. in the air for 0.5 hour, as shown in Table 3. As to the obtained magnetite particles, the specific surface area, FeO % by weight within the particles, the magnetic properties, and the particle shape thereof were evaluated by the same methods as in Example 1. The obtained results are shown in Table 5.

EXAMPLES 20 TO 22

The magnetite particles D obtained in Example 19 were treated in the same manner as in Example 19 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 5.

EXAMPLE 23

As shown in Table 1, the same treatment as in Example 1 was made except that the concentration of the sodium silicate aqueous solution and the amount of the sodium hydroxide aqueous solution were changed, whereby magnetite particles E were obtained.

As to the obtained magnetite particles E, the specific surface area, FeO % by weight within the particles, the magnetic properties, and the particle shape thereof were evaluated by the same methods as in Example 1. The obtained results are shown in Table 2.

Further, the magnetite particles E were heated at 150° C. in the air for 0.5 hour, as shown in Table 3. As to the obtained magnetite particles, the specific surface area, FeO % by weight within the particles, the magnetic properties, and the particle shape thereof were evaluated by the same methods as in Example 1. The obtained results are shown in Table 5.

EXAMPLES 24 TO 26

The magnetite particles E obtained in Example 23 were treated in the same manner as in Example 23 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 5.

COMPARATIVE EXAMPLE 1

As shown in Table 1, the same treatment as in Example 1 was made except that the sodium silicate aqueous solution was not added and the amount of the sodium hydroxide aqueous solution were changed, whereby magnetite particles F were obtained. As to the obtained magnetite particles F, the specific surface area, FeO % by weight within the particles, the magnetic properties, and the particle shape thereof were evaluated by the same methods as in Example 1. The obtained results are shown in Table 2.

Further, the magnetite particles F were heated at 150° C. in the air for 0.5 hour, as shown in Table 3. As to the obtained magnetite particles, the specific surface area, FeO % by weight within the particles, the magnetic properties, and the particle shape thereof were evaluated by the same methods as in Example 1. The obtained results are shown in Table 5.

COMPARATIVE EXAMPLES 2 TO 4

The magnetite particles F obtained in Comparative Example 1 were treated in the same manner as in Comparative Example 1 by changing the conditions of the heat treatment, such as atmosphere and time as shown in Table 3.

As to the obtained magnetite particles, the specific surface area, FeO % by weight within the particles, the magnetic properties, and the particle shape thereof were evaluated by the same methods as in Example 1. The obtained results are shown in Table 5.

TABLE 1

| Magnetite particles | ferous sulfate solution | | sodium silicate (No. 3) solution | | sodium hydroxide solution | | temperature (°C.) | residual NaOH in mixed solution (g/l) |
|---|---|---|---|---|---|---|---|---|
| | concentration (mol/l) | liquid volume (l) | concentration (mol/l) | liquid volume (l) | concentration (mol/l) | liquid volume (l) | | |
| A | 2.0 | 50 | 0.192 | 20 | 5.0 | 43 | 90 | 4.3 |
| B | 2.0 | 50 | 0.073 | 20 | 5.0 | 42 | 90 | 2.5 |
| C | 2.0 | 50 | 0.459 | 20 | 5.0 | 47 | 90 | 9.7 |
| D | 2.0 | 50 | 0.192 | 20 | 5.0 | 42 | 90 | 2.4 |
| E | 2.0 | 50 | 0.073 | 20 | 5.0 | 41 | 90 | 0.9 |
| F | 2.0 | 50 | — | — | 5.0 | 43 | 90 | 4.9 |

TABLE 2

| Magnetite particles | Si/particle (wt %) | BET specific surface area (m²/g) | contents of FeO (wt %) | saturated magnetization ($\delta_s$) (emu/g) | | residual magnetization ($\delta_r$) (emu/g) | | coercive force (Hc) (Oe) | | particle shape |
|---|---|---|---|---|---|---|---|---|---|---|
| | | | | 10 KOe | 1 KOe | 10 KOe | 1 KOe | 10 KOe | 1 KOe | |
| A | 1.3 | 5.7 | 26.9 | 84.3 | 55.8 | 7.8 | 6.6 | 105 | 93 | octahedron |
| B | 0.5 | 7.8 | 25.4 | 82.5 | 60.3 | 11.2 | 10.0 | 129 | 118 | octahedron |
| C | 3.0 | 7.5 | 24.8 | 81.5 | 55.8 | 10.6 | 9.0 | 120 | 110 | octahedron |
| D | 1.3 | 11.3 | 26.6 | 81.6 | 60.6 | 11.4 | 10.6 | 133 | 122 | octahedron |
| E | 0.5 | 8.6 | 25.0 | 85.1 | 63.0 | 8.9 | 7.9 | 108 | 96 | cubic |
| F | 0 | 6.3 | 26.1 | 84.7 | 62.8 | 11.0 | 10.1 | 116 | 112 | octahedron |

TABLE 3

| Examples - Comp. Ex. | magnetite particles used | conditions of heat treatment | | | Examples - Comp. Ex. | magnetite particles used | conditions of heat treatment | | |
|---|---|---|---|---|---|---|---|---|---|
| | | temper. (°C.) | atmosphere | time (Hr) | | | temper. (°C.) | atmosphere | time (Hr) |
| Example 1 | A | 150 | in air | 0.5 | Example 16 | C | 150 | in air | 6.0 |
| Example 2 | A | 150 | in air | 1.0 | Example 17 | C | 150 | in N₂ | 0.5 |
| Example 3 | A | 150 | in air | 2.0 | Example 18 | C | 150 | in N₂ | 6.0 |
| Example 4 | A | 150 | in air | 6.0 | Example 19 | D | 150 | in air | 0.5 |
| Example 5 | A | 150 | in N₂ | 0.5 | Example 20 | D | 150 | in air | 6.0 |
| Example 6 | A | 150 | in N₂ | 1.0 | Example 21 | D | 150 | in N₂ | 0.5 |
| Example 7 | A | 150 | in N₂ | 2.0 | Example 22 | D | 150 | in N₂ | 6.0 |
| Example 8 | A | 150 | in N₂ | 6.0 | Example 23 | E | 150 | in air | 0.5 |
| Example 9 | B | 150 | in air | 0.5 | Example 24 | E | 150 | in air | 6.0 |
| Example 10 | B | 150 | in air | 2.0 | Example 25 | E | 150 | in N₂ | 0.5 |
| Example 11 | B | 150 | in air | 6.0 | Example 26 | E | 150 | in N₂ | 6.0 |
| Example 12 | B | 150 | in N₂ | 0.5 | Comp. Ex. 1 | F | 150 | in air | 0.5 |
| Example 13 | B | 150 | in N₂ | 2.0 | Comp. Ex. 2 | F | 150 | in air | 6.0 |
| Example 14 | B | 150 | in N₂ | 6.0 | Comp. Ex. 3 | F | 150 | in N₂ | 0.5 |
| Example 15 | C | 150 | in air | 0.5 | Comp. Ex. 4 | F | 150 | in N₂ | 6.0 |

TABLE 4

| Examples | BET specific surface area ($m^2/g$) | contents of FeO (wt %) | coercive force (Hc) (Oe) 10 KOe | coercive force (Hc) (Oe) 1 KOe | saturated magnetization ($\delta s$) (emu/g) 10 KOe | saturated magnetization ($\delta s$) (emu/g) 1 KOe | residual magnetization ($\delta r$) (emu/g) 10 KOe | residual magnetization ($\delta r$) (emu/g) 1 KOe | particle shape |
|---|---|---|---|---|---|---|---|---|---|
| Example 1  | 5.7 | 23.4 | 72 | 67 | 83.2 | 57.8 | 5.5  | 4.9  | octahedron |
| Example 2  | 5.7 | 21.8 | 66 | 61 | 81.9 | 59.1 | 5.3  | 4.7  | octahedron |
| Example 3  | 5.7 | 20.6 | 56 | 53 | 81.4 | 60.6 | 5.6  | 4.9  | octahedron |
| Example 4  | 5.6 | 19.4 | 54 | 52 | 80.4 | 61.6 | 6.9  | 6.8  | octahedron |
| Example 5  | 5.7 | 26.5 | 56 | 54 | 85.7 | 66.6 | 5.5  | 5.3  | octahedron |
| Example 6  | 5.8 | 26.7 | 56 | 53 | 85.2 | 67.1 | 5.5  | 5.4  | octahedron |
| Example 7  | 5.7 | 26.3 | 56 | 57 | 85.9 | 67.4 | 6.0  | 5.8  | octahedron |
| Example 8  | 5.6 | 26.1 | 57 | 59 | 86.3 | 68.3 | 7.4  | 7.3  | octahedron |
| Example 9  | 7.6 | 22.1 | 95 | 93 | 81.5 | 63.2 | 10.5 | 9.7  | octahedron |
| Example 10 | 7.6 | 20.8 | 98 | 97 | 81.1 | 62.8 | 10.1 | 10.8 | octahedron |
| Example 11 | 7.6 | 19.1 | 98 | 98 | 80.8 | 62.1 | 12.2 | 12.0 | octahedron |
| Example 12 | 7.7 | 25.1 | 92 | 91 | 82.4 | 66.3 | 13.4 | 13.1 | octahedron |
| Example 13 | 7.6 | 25.3 | 92 | 91 | 82.1 | 64.4 | 13.3 | 13.1 | octahedron |
| Example 14 | 7.6 | 25.0 | 92 | 91 | 82.3 | 66.4 | 12.8 | 12.7 | octahedron |
| Example 15 | 7.2 | 22.0 | 93 | 88 | 80.5 | 57.8 | 9.8  | 8.7  | octahedron |

TABLE 5

| Examples - Comp. Ex. | BET specific surface area ($m^2/g$) | contents of FeO (wt %) | coercive force (Hc) (Oe) 10 KOe | coercive force (Hc) (Oe) 1 KOe | saturated magnetization ($\delta s$) (emu/g) 10 KOe | saturated magnetization ($\delta s$) (emu/g) 1 KOe | residual magnetization ($\delta r$) (emu/g) 10 KOe | residual magnetization ($\delta r$) (emu/g) 1 KOe | particle shape |
|---|---|---|---|---|---|---|---|---|---|
| Example 16 | 7.1  | 18.3 | 92  | 86  | 79.5 | 58.3 | 11.0 | 10.7 | octahedron |
| Example 17 | 7.1  | 24.9 | 88  | 85  | 81.6 | 59.5 | 10.5 | 9.3  | octahedron |
| Example 18 | 7.1  | 24.7 | 87  | 84  | 81.3 | 60.1 | 10.9 | 10.4 | octahedron |
| Example 19 | 11.1 | 22.5 | 99  | 96  | 79.9 | 61.3 | 11.8 | 10.9 | octahedron |
| Example 20 | 11.0 | 18.1 | 98  | 97  | 79.1 | 61.2 | 11.9 | 11.1 | octahedron |
| Example 21 | 11.0 | 26.5 | 97  | 95  | 81.4 | 62.0 | 11.8 | 11.0 | octahedron |
| Example 22 | 11.0 | 26.3 | 98  | 95  | 81.3 | 61.9 | 11.8 | 11.1 | octahedron |
| Example 23 | 8.6  | 22.2 | 77  | 70  | 83.4 | 64.2 | 9.3  | 8.4  | cubic |
| Example 24 | 8.5  | 19.0 | 70  | 68  | 79.8 | 65.5 | 9.7  | 9.4  | cubic |
| Example 25 | 8.5  | 24.6 | 75  | 72  | 85.6 | 67.2 | 9.2  | 8.6  | cubic |
| Example 26 | 8.5  | 24.5 | 71  | 70  | 85.8 | 68.0 | 9.3  | 9.5  | cubic |
| Comp. Ex. 1 | 6.2 | 23.0 | 118 | 115 | 81.5 | 60.5 | 11.1 | 10.3 | octahedron |
| Comp. Ex. 2 | 6.2 | 19.1 | 122 | 118 | 79.1 | 59.8 | 11.2 | 10.5 | octahedron |
| Comp. Ex. 3 | 6.2 | 26.0 | 118 | 113 | 84.5 | 61.4 | 11.0 | 10.1 | octahedron |
| Comp. Ex. 4 | 6.2 | 25.8 | 118 | 112 | 84.6 | 61.2 | 11.3 | 10.1 | octahedron |

As can be seen from these results, coercive forces of all magnetite particles containing silicon therein in which lattices of the magnetite particles are allowed to strain were decreased. On the other hand, coercive forces of silicon-free magnetite particles were almost not changed or they were slightly increased. Further, the following tendencies have been found. That is, surface oxidation of the magnetite particles can be prevented by heat treating those in a nitrogen gas, a reduction of the saturation magnetization can be prevented, and further, a saturation magnetization and residual magnetization are increased at 1 kOe in the external magnetic field.

As described above, magnetite particles according to the present invention, which is obtained by adding sodium silicate aqueous solution and heat treating have a coercive force of 40 to 100 Oe in the particle shape of an octahedron, and a coercive force of 40 to 80 Oe in the particle shape of a cubic, and have a specific surface area of 5 to 20 $m^2/g$ as determined by the BET method. Accordingly, the magnetite particles according to the present invention have such features that they are well dispersed into toners and the fine line reproducibility thereof is enhanced, with the result that they are preferably used for particularly, electrostatic copying magnetic toners.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within meaning and range of equivalency of the claims are therefore intended to be embraced therein.

What is claimed is:

1. Magnetite particles having a particle shape of an octahedron, a specific surface area of 5 $m^2/g$ or more as determined by the BET method and a coercive force of 40 to 100 Oe.

2. Magnetite particles having a particle shape of a cubic, a specific surface area of 6 $m^2/g$ or more as determined by the BET method and a coercive force of 40 to 80 Oe.

3. Magnetite particles according to claim 1, further including silicon in the amount of 0.1 to 3.0% by weight with respect to the magnetite particles.

4. A process for production of magnetite particles, comprising the steps of mixing an aqueous solution of ferrous salt with a silicate aqueous solution to obtain a mixed solution, further mixing the thus obtained mixed solution with an alkaline aqueous solution to obtain a ferrous hydroxide slurry, oxidizing the thus obtained ferrous hydroxide slurry to obtain an oxidized hydroxide slurry and washing it with water, filtrating, drying and grinding to obtain magnetite particles, and heat treating the thus magnetite particles so that the content of FeO within the magnetite particles is 18% by weight or more.

5. A production process of magnetite particles according to claim 4, wherein an atmosphere of said heat treatment is an oxidizing one or an inert one.

6. Magnetite particles according to claim 2, further including silicon in the amount of 0.1 to 3.0% by weight with respect to the magnetite particles.

* * * * *